(12) United States Patent
Boury et al.

(10) Patent No.: US 7,661,926 B2
(45) Date of Patent: Feb. 16, 2010

(54) TURBOMACHINE BLADE

(75) Inventors: Jacques Auguste Amedee Boury, Saint Ouen En Brie (FR); Erwan Daniel Botrel, Alfortville (FR)

(73) Assignee: SNECMA, Paris (FR)

( * ) Notice: Subject to any disclaimer, the term of this patent is extended or adjusted under 35 U.S.C. 154(b) by 341 days.

(21) Appl. No.: 11/492,015

(22) Filed: Jul. 25, 2006

(65) Prior Publication Data

US 2007/0025857 A1 Feb. 1, 2007

(30) Foreign Application Priority Data

Jul. 26, 2005 (FR) .................................. 05 07925

(51) Int. Cl.
*F01D 5/02* (2006.01)
*F01D 11/08* (2006.01)

(52) U.S. Cl. ................................. 415/170.1; 415/173.1
(58) Field of Classification Search .............. 415/170.1, 415/173.1, 173.3, 173.6, 228, 236 R, 223 R; 416/228, 236 R, 223 R
See application file for complete search history.

(56) References Cited

U.S. PATENT DOCUMENTS

| 5,261,789 | A | 11/1993 | Butts et al. |
| 2003/0223870 | A1 * | 12/2003 | Keith et al. ............... 416/97 R |
| 2004/0197190 | A1 | 10/2004 | Stec et al. |

FOREIGN PATENT DOCUMENTS

EP    1 231 359 A2    8/2002

* cited by examiner

*Primary Examiner*—Edward Look
*Assistant Examiner*—Dwayne J White
(74) *Attorney, Agent, or Firm*—Oblon, Spivak, McClelland, Maier & Neustadt, L.L.P.

(57) ABSTRACT

A turbomachine blade presenting a free end having an end wall from which there projects a rim, the rim including a first fraction starting from the trailing edge of the blade and running along the suction side of the blade to a connection zone, and a second fraction of closed outline connected to the first fraction at the region of the connection zone. The second fraction extends the first fraction, running along the suction side of the blade, along the leading edge of the blade, and then returning to the connection zone.

12 Claims, 2 Drawing Sheets

TURBOMACHINE BLADE

The invention relates to a turbomachine blade having a free end with an end wall from which there projects a rim. By way of example, the blade may be a rotor blade in a turbojet turbine or compressor.

BACKGROUND OF THE INVENTION

FIGS. 1 and 2 show the free end of a known type of turbine rotor blade 1. At its free end 3, the blade presents an open cavity or bathtub 2 defined by an end wall 8 and a rim 9 of closed outline that projects from the periphery of said end wall. The rim runs along the suction side 4, the leading edge 6, the pressure side 5, and the trailing edge 7 of the blade.

When mounted inside a turbojet, the rotor blades 1 are surrounded by a ring 30, shown in FIG. 2. The rim 9 serves to prevent the end wall 8 from rubbing against the ring 30. In addition, it serves to optimize the clearance J between the free end 3 of the blade and the ring 30 so as to limit gas flow in this region.

The aerodynamic design of a turbine blade requires the distance from the leading edge to the trailing edge of the blade to be longer on the suction side than on the pressure side.

The gas passing over the suction side of the blade has a longer distance to travel than the gas passing over the pressure side, so it has a comparatively greater flow speed. Thus, on the suction side, the pressure exerted by the gas on the blade is lower than that exerted on the pressure side. This establishes a pressure gradient that enables the rotor to be turned.

The pressure gradient is also at the origin of a certain volume of gas F passing through the clearance J between the rim 9 and the ring 30, this gas F going from the pressure side towards the suction side.

Unfortunately, this phenomenon is harmful to the efficiency of the turbine since the gas F does not contribute to rotating the rotor.

OBJECTS AND SUMMARY OF THE INVENTION

An object of the present invention is to limit the volume of the gas F that passes from the pressure side to the suction side between the rim and the ring, in order to improve the efficiency of the turbomachine.

To achieve this object, the invention provides a turbomachine blade presenting a free end having an end wall from which there projects a rim, wherein said rim comprises a first fraction starting from the trailing edge of the blade and running along the suction side of the blade to a connection zone, and a second fraction of closed outline connected to the first fraction at the region of said connection zone, and wherein said second fraction extends the first fraction, running along the suction side of the blade, along the leading edge of the blade, and then returning to the connection zone.

The invention seeks to lengthen the distance traveled by the gas flowing along said rim on the pressure side. This gas is referred to below as the pressure-side gas.

The pressure-side gas flows along the portion of said second fraction situated between the leading edge and the connection zone, and along said first fraction. The distance traveled on the pressure side is thus longer than the distance that would have been traveled with a blade of the type shown in FIGS. 1 and 2. The flow speed of the gas is therefore higher and the static pressure it exerts on the pressure-side rim is lower. In contrast, the static pressure exerted by the suction-side gas is the same as with a blade of the type shown in FIGS. 1 and 2, since the distance traveled by the suction-side gas along the rim on the suction side remains unchanged.

This produces a reduction in the static pressure gradient exerted on the rim by the pressure-side and suction-side gases, thereby reducing the volume of gas passing between the rim and the surrounding ring.

BRIEF DESCRIPTION OF THE DRAWINGS

The invention and its advantages can be better understood on reading the following detailed description. The description refers to the accompanying figures, in which.

MORE DETAILED DESCRIPTION

Figure 3:
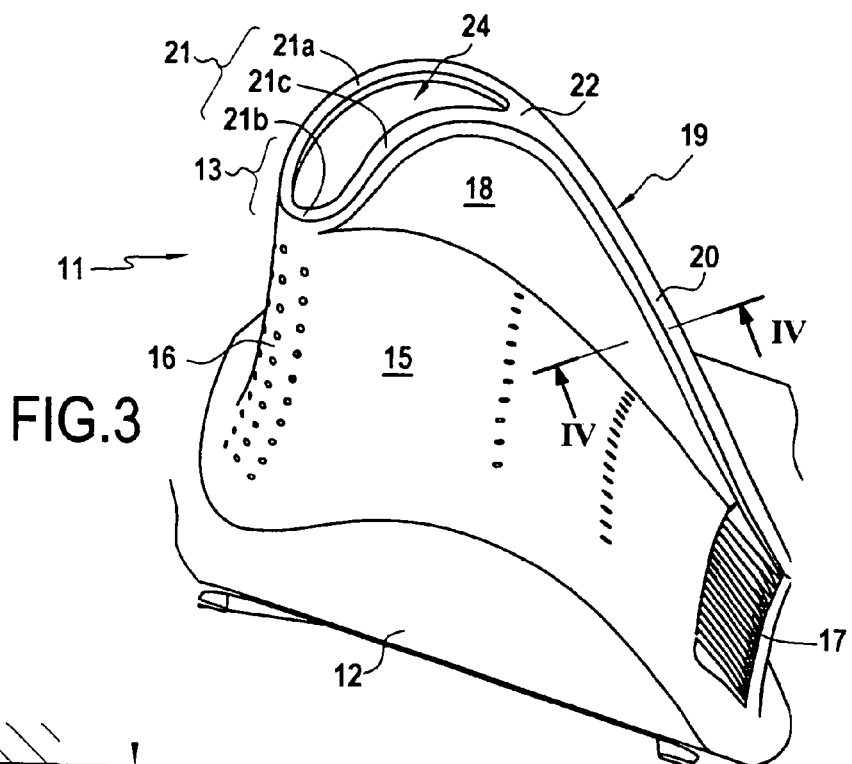
FIG. 3 is a perspective view of a first example of a blade of the invention.
Figure 4:
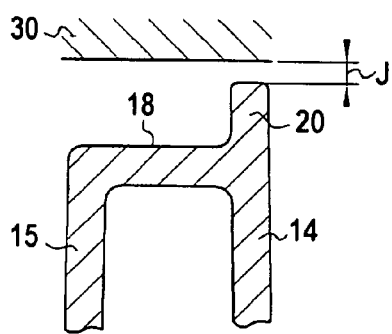
FIG. 4 is a section view on plane IV-IV of FIG. 3.
Figure 5:
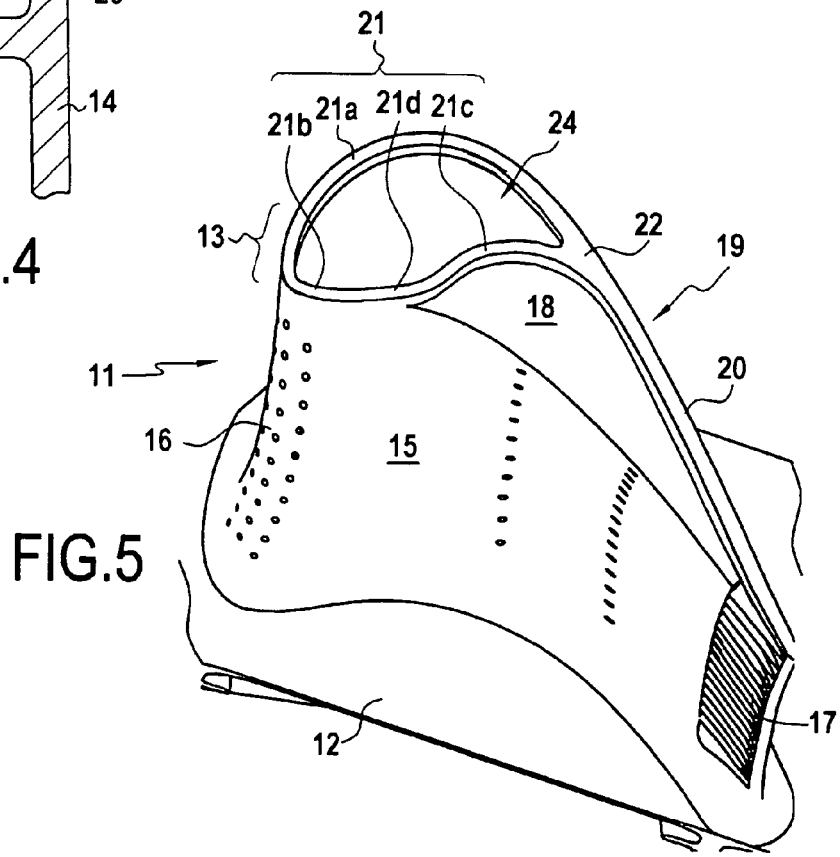
FIG. 5 is a perspective view of a second example of a blade of the invention.

The blade examples 11 shown in FIGS. 3 to 5 are rotor blades for a high pressure turbine in a turbojet. Each blade 11 presents a root 12 and a free end 13 remote from the root 12. The blade 11 is hollow so as to be capable of being cooled from the inside by cold air. When it is mounted inside a turbojet, the blade 11 is surrounded by a ring 30, as shown in FIG. 4.

The blade 11 has an aerodynamic profile: it presents a rounded upstream or leading edge 16, and it tapers to its downstream or trailing edge 17. It also has two opposite sides: a convex suction side 14 and a concave pressure side 15.

The free end 13 of the blade has an end wall 18 extending over the entire end of the blade and from which there projects a rim 19. The rim 19 is made up of two fractions 20 and 21.

The first fraction 20 goes from the trailing edge 17 and runs along the suction side 14 to a connection zone 22. The connection zone 22 is a zone of the rim 19 situated at the periphery of the end wall 18 on the suction side of the blade, between its leading edge 16 and its trailing edge 17. The connection zone 22 is situated at a significant distance from the trailing edge 17.

The second fraction 21 of the rim 19 comprises at least three segments:

- a suction-side segment 21a running from the connection zone 22 extending the first fraction 20 of the rim and running along the suction side 14 of the blade;
- a leading segment 21b extending the suction-side segment 21a and running along the leading 16 of the blade; and
- a connection segment 21c extending from the leading edge 16 or the pressure side 15 of the blade to the connection zone 22.

In the example of FIG. 3, the second fraction 21 of the rim 19 is made up of solely of three segments 21a, 21b, and 21c, such that the connection segment 21c extends the leading segment 21b.

In the example of FIG. 5, the second fraction 21 of the rim includes a fourth segment referred to as a pressure-side segment 21d which runs along a portion of the pressure side of the blade 15. This pressure-side segment 21d extends the leading segment 21b and is itself extended by the connection segment 21c.

The first fraction 20 of the rim 19, the suction-side segment 21a, the leading segment 21b, and the optional pressure-side segment 21d all run along the periphery of the end wall 17 of the blade. Since this periphery is generally curved, these portions of the rim 19 are also curved. Advantageously, in order to ensure that the rim 19 presents an aerodynamic profile, the connection segment 21c is also curved.

In the example of FIG. 3, as in the example of FIG. 5, the second fraction 21 of the rim 19 presents a closed outline which co-operates with the end wall 18 to define a bathtub 24 of size that is reduced compared with previously-known bathtubs.

As explained above, the invention serves to increase the flow speed of the pressure-side gas along the rim 19 by lengthening its travel distance. The pressure-side gas flows along a portion of the leading segment 21b, along the pressure-side segment 21d, if any, along the connection segment 21c, and then along the first fraction 20 of the rim 19 prior to reaching the trailing edge 17.

Advantageously, in order to increase the travel distance of the pressure-side gas, the length of the first fraction 20 of the rim 19 is increased. For this purpose, the distance between the connection zone 22 and the leading edge 19, as measured along the suction side 14, can be shorter than the distance between the connection zone 22 and the trailing edge 17, likewise measured along the suction side 14.

Furthermore, since the invention seeks to increase the flow speed of the pressure-side gas along the rim 19, it is appropriate to guide the gas and limit any turbulence in its flow. For this purpose, the connection segment 21c plays an important role since it guides the gas towards the first fraction 20 of the rim 19.

Advantageously, the junction zone between the connection segment 21c and the first fraction 20 of the rim is curved so as to avoid creating any turbulence in the flow of the pressure-side gas in this region. This junction zone corresponds to the portion of the connection zone 22 that faces towards the pressure side 15.

Also advantageously, in order to ensure the gas is properly guided, while giving the pressure-side gas a sufficient distance to travel along the rim 19, the connection segment 21c and the first fraction 20 of the rim 19 together form a curve that is convex towards the suction side of the blade.

Figure 1:
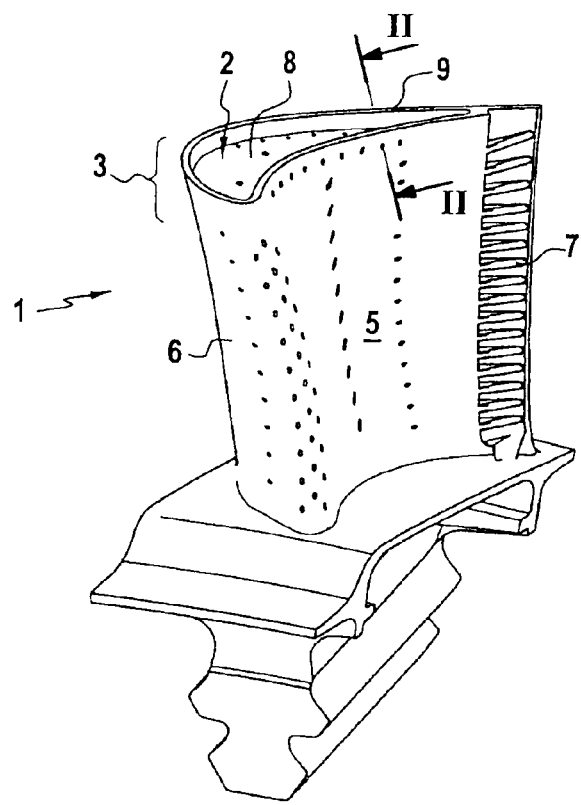
FIG. 1 is a perspective view showing an example of a blade of known type.
Figure 2:
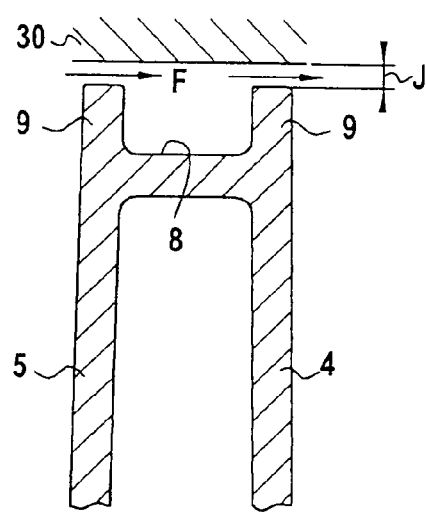
FIG. 2 is a section view on plane II-II of FIG. 1.

Thus, in the example of FIG. 2, the closed outline of the bathtub 24 defined by the second fraction 21 of the rim 19, is generally in the form of a meniscus having a rounded first end adjacent to the leading edge 16 of the blade, and a tapering second end in the region of the connection zone 22.

What is claimed is:

1. A turbomachine blade presenting a free end having an end wall from which there projects a rim, wherein said rim comprises a first fraction starting from the trailing edge of the blade and running along the suction side of the blade to a connection zone, and a second fraction of closed outline connected to the first fraction at the region of said connection zone, wherein said second fraction extends the first fraction, running along the suction side of the blade, along the leading edge of the blade, and then returning to the connection zone, and wherein the distance between the connection zone and the leading edge measured along the suction side is shorter than the distance between the connection zone and the trailing edge measured along the suction side.

2. A blade according to claim 1, wherein said second fraction of the rim comprises a suction-side segment running along the suction side of the blade, a leading segment running along the leading edge of the blade, and a connection segment extending from the leading edge or the pressure side of the blade, to said connection zone situated on the suction side of the blade.

3. A blade according to claim 2, wherein said first fraction of the rim, said suction-side segment and said leading segment run along the periphery of the end wall of the blade.

4. A blade according to claim 2, wherein said second fraction of the rim further comprises, between the leading segment and the connection segment, a pressure-side segment running along a portion of the pressure side of the blade.

5. A blade according to claim 4, wherein said first fraction of the rim, said suction-side segment, said leading segment and said pressure-side segment, run along the periphery of the end wall of the blade.

6. A blade according to claim 2, wherein the connection segment is curved.

7. A blade according to claim 2, wherein the junction zone between the connection segment and the first fraction of the rim is curved.

8. A blade according to claim 2, wherein the connection segment and the first fraction of the rim together form a curve that is convex towards the suction side of the blade.

9. A blade according to claim 1 of a turbojet turbine.

10. A turbine including a blade according to claim 1.

11. A turbomachine including a blade according to claim 1.

12. A turbomachine blade presenting a free end having an end wall from which there projects a rim, wherein said rim comprises a first fraction starting from the trailing edge of the blade and running along the suction side of the blade to a connection zone, and a second fraction of closed outline connected to the first fraction at the region of said connection zone, wherein said second fraction extends the first fraction, running along the suction side of the blade, along the leading edge of the blade, and then returning to the connection zone, so that the pressure-side gas, which flows along the rim, flows along a portion of said second fraction extending between the leading edge and the connection zone, and then along said first fraction, and wherein the distance between the connection zone and the leading edge measured along the suction side is shorter than the distance between the connection zone and the trailing edge measured along the suction side.

* * * * *